(12) United States Patent
Kishi et al.

(10) Patent No.: US 10,636,224 B2
(45) Date of Patent: Apr. 28, 2020

(54) CHARACTERISTIC EVALUATION DEVICE FOR GAS TURBINE AND CHARACTERISTIC EVALUATION METHOD FOR GAS TURBINE

(71) Applicant: Mitsubishi Hitachi Power Systems, Ltd., Kanagawa (JP)

(72) Inventors: Makoto Kishi, Tokyo (JP); Keita Fujii, Kanagawa (JP); Shingo Ito, Tokyo (JP); Junichi Kobayashi, Tokyo (JP); Kwin Malhotra, Kanagawa (JP); Naoki Sakagami, Kanagawa (JP); Masato Araki, Tokyo (JP)

(73) Assignee: Mitsubishi Hitachi Power Systems, Ltd., Kanagawa (JP)

( * ) Notice: Subject to any disclaimer, the term of this patent is extended or adjusted under 35 U.S.C. 154(b) by 0 days.

(21) Appl. No.: 16/083,282

(22) PCT Filed: Nov. 28, 2016

(86) PCT No.: PCT/JP2016/085176
§ 371 (c)(1),
(2) Date: Sep. 7, 2018

(87) PCT Pub. No.: WO2017/163489
PCT Pub. Date: Sep. 28, 2017

(65) Prior Publication Data
US 2019/0080523 A1    Mar. 14, 2019

(30) Foreign Application Priority Data

Mar. 22, 2016   (JP) ................................ 2016-057187

(51) Int. Cl.
*G07C 3/00*    (2006.01)
*F02C 7/00*    (2006.01)
(Continued)

(52) U.S. Cl.
CPC ............ *G07C 3/00* (2013.01); *F01D 21/003* (2013.01); *F01D 25/00* (2013.01); *F02C 7/00* (2013.01);
(Continued)

(58) Field of Classification Search
CPC . F01D 25/00; F01D 21/03; F02C 7/00; G07C 3/00; F05D 2260/80; F05D 2260/821
(Continued)

(56) References Cited

U.S. PATENT DOCUMENTS

2007/0012044 A1   1/2007   Osborn et al.
2011/0106680 A1   5/2011   Vittal et al.
(Continued)

FOREIGN PATENT DOCUMENTS

JP   2002-73156   3/2002
JP   2003-83089   3/2003
(Continued)

OTHER PUBLICATIONS

Written Opinion of the International Searching Authority dated Feb. 14, 2017 in International (PCT) Application No. PCT/JP2016/085176.
(Continued)

*Primary Examiner* — Atul Trivedi
(74) *Attorney, Agent, or Firm* — Wenderoth, Lind & Ponack, L.L.P.

(57) ABSTRACT

A characteristic evaluation device is for a gas turbine that includes a compressor, a combustor, and a turbine includes a processor. The processor calculates, in gas-turbine characteristics including characteristics of at least one of the compressor, the combustor, and the turbine, a correction value for correcting influence due to environmental conditions in which the gas turbine is placed based on operation data of the gas turbine. The processor also calculates the
(Continued)

gas-turbine characteristics corrected based on the correction value, and evaluates the gas turbine by comparing the gas-turbine characteristics after correction with a predetermined reference value.

4 Claims, 9 Drawing Sheets

(51) Int. Cl.
    *F01D 25/00*     (2006.01)
    *F01D 21/00*     (2006.01)
(52) U.S. Cl.
    CPC .... *F05D 2260/80* (2013.01); *F05D 2260/821* (2013.01)
(58) Field of Classification Search
    USPC ........................................................ 701/29.4
    See application file for complete search history.

(56) References Cited

U.S. PATENT DOCUMENTS

| | | | | |
|---|---|---|---|---|
| 2013/0054031 A1* | 2/2013 | Wilkes | ................... | G05B 17/02 700/274 |
| 2013/0066615 A1* | 3/2013 | Morgan | ................... | G06F 17/11 703/7 |
| 2013/0073170 A1* | 3/2013 | Drohan | ................... | F01D 17/08 701/100 |
| 2014/0093350 A1* | 4/2014 | Meisner | ................... | F01D 17/00 415/1 |
| 2014/0156165 A1* | 6/2014 | Ewens | ................... | F02C 9/54 701/100 |
| 2014/0227109 A1* | 8/2014 | Wang | ................... | F02B 37/12 417/53 |
| 2014/0257666 A1* | 9/2014 | Abrol | ................... | F02C 9/48 701/100 |
| 2015/0027100 A1* | 1/2015 | Qin | ................... | F02C 7/228 60/39.091 |
| 2015/0066223 A1* | 3/2015 | Saraswat | ................ | G05B 15/02 700/287 |
| 2015/0068191 A1* | 3/2015 | Panciroli | ............. | F02D 41/0087 60/273 |
| 2015/0081121 A1* | 3/2015 | Morgan | ................... | F02C 9/00 700/287 |
| 2015/0168229 A1* | 6/2015 | DeSilva | ................. | G01K 11/24 60/772 |
| 2015/0171705 A1* | 6/2015 | Hino | ................... | F01D 15/10 290/1 A |
| 2015/0185716 A1* | 7/2015 | Wichmann | ............ | F01K 23/101 700/287 |
| 2015/0226133 A1* | 8/2015 | Minto | ................... | F02C 3/34 60/39.27 |
| 2015/0244007 A1* | 8/2015 | Nakamoto | ........ | H01M 8/04395 429/446 |
| 2015/0315978 A1* | 11/2015 | Davies | ................... | F02C 9/40 60/773 |
| 2015/0315979 A1* | 11/2015 | Davies | ................... | F02C 9/40 60/773 |
| 2015/0354466 A1* | 12/2015 | Higashi | ................... | F02C 9/28 60/776 |
| 2015/0377146 A1* | 12/2015 | Della-Fera | ................ | F02C 9/16 60/772 |
| 2016/0003164 A1* | 1/2016 | Karpman | ............... | G05B 17/02 60/772 |
| 2016/0010493 A1* | 1/2016 | O'Dea | ................... | F23R 3/26 60/776 |
| 2016/0010495 A1* | 1/2016 | Mueller | ............. | G05B 23/0221 701/100 |
| 2016/0025596 A1* | 1/2016 | Heda | ................... | G05B 23/0232 73/112.06 |
| 2016/0146118 A1* | 5/2016 | Wichmann | ................ | F02C 9/50 701/100 |
| 2016/0147204 A1* | 5/2016 | Wichmann | ........... | G05B 13/042 700/287 |
| 2016/0222816 A1* | 8/2016 | Chen | ................... | F01D 17/04 |
| 2016/0252015 A1* | 9/2016 | Kusumi | ................... | F03D 9/00 290/40 B |
| 2016/0273457 A1* | 9/2016 | Engler | ................... | F23R 3/26 |
| 2016/0281607 A1* | 9/2016 | Asati | ......................... | F02C 9/28 |
| 2017/0030259 A1* | 2/2017 | Tabata | ................... | F02D 41/10 |
| 2017/0074175 A1* | 3/2017 | Uyama | ................... | F02C 9/20 |
| 2017/0101946 A1* | 4/2017 | Conte | ................. | F02D 41/0052 |
| 2017/0138272 A1* | 5/2017 | Kusumi | ................... | F02C 7/057 |
| 2017/0175567 A1* | 6/2017 | Talukdar | ............ | G05B 23/0243 |
| 2018/0306124 A1* | 10/2018 | Choi | ................... | F02C 9/20 |
| 2019/0063335 A1* | 2/2019 | Takaki | ................... | F01D 15/10 |

FOREIGN PATENT DOCUMENTS

| | | |
|---|---|---|
| JP | 2007-192138 | 8/2007 |
| JP | 2011-94620 | 5/2011 |
| JP | 2014-111937 | 6/2014 |

OTHER PUBLICATIONS

International Search Report dated Feb. 14, 2017 in International (PCT) Application No. PCT/JP2016/085176.
Notice of Reasons for Refusal dated Jan. 28, 2020 in Japanese Application No. 2016-057187, with English translation.

* cited by examiner

CHARACTERISTIC EVALUATION DEVICE FOR GAS TURBINE AND CHARACTERISTIC EVALUATION METHOD FOR GAS TURBINE

FIELD

The present invention relates to a characteristic evaluation device for a gas turbine and a characteristic evaluation method for a gas turbine.

BACKGROUND

A gas turbine is formed of a compressor, a combustor, and a turbine. The compressor compresses air that has been taken from an air inlet to turn the air into compressed air of a high temperature and high pressure. The combustor supplies fuel to and combusts this compressed air to obtain combustion gas of a high temperature and high pressure. This combustion gas causes the turbine to be driven and causes a generator connected to this turbine to be driven. The combustion gas that causes the turbine to be driven is discharged as flue gas from a flue gas side of the turbine.

The gas turbine described above may reduce output because continuous use of the gas turbine causes contamination, deterioration, and the like. Due to this situation, abnormality in an operation state of the gas turbine has been monitored (for example, refer to Japanese Patent Application Laid-open No. 2007-192138), and characteristics of the gas turbine have been evaluated.

In the gas turbine described above, the surrounding environment may cause characteristics to be changed. For example, when an atmospheric temperature increases, a flow amount of air taken into the compressor is reduced. When a flow amount of air taken into the compressor is reduced, a supply amount of fuel to the compressed air needs to be reduced because there are limitations on a turbine inlet temperature. In this manner, output of the gas turbine is decreased. Thus, when a change in characteristics of the gas turbine due to contamination, deterioration, and the like is evaluated, influence of a change in characteristics caused by environmental conditions needs to be eliminated.

Conventionally, influence of a change in characteristics caused by environmental conditions has been reduced by preliminarily defining a correction value depending on environmental conditions, and correcting characteristics of a gas turbine, based on the correction value. However, the preliminarily defined correction value is not defined based on actual operation data, and there may be a gap between actual characteristics and characteristics of a gas turbine after correction based on the correction value. Thus, accuracy of an evaluation may be reduced.

In view of the foregoing, an object of the present invention is to provide a characteristic evaluation device for a gas turbine and a characteristic evaluation device for a gas turbine, which are capable of making a highly accurate evaluation.

SUMMARY OF THE INVENTION

A characteristic evaluation device for a gas turbine according to the present invention is a characteristic evaluation device for a gas turbine that includes a compressor configured to compress air, a combustor supplied with fuel to combust the compressed air compressed by the compressor, and a turbine configured to be rotated by combustion gas generated by the combustor. The device includes a processor configured to calculate, in gas-turbine characteristics including characteristics of at least one of the compressor, the combustor, and the turbine, a correction value for correcting influence due to environmental conditions in which the gas turbine is placed, based on operation data of the gas turbine, calculate the gas-turbine characteristics corrected based on the correction value, and evaluate the gas turbine by comparing the gas-turbine characteristics after correction with a predetermined reference value.

According to the present invention, a highly accurate correction value can be obtained by calculating a correction value for correcting influence due to environmental conditions based on operation data of a gas turbine. An evaluation on a gas turbine is made by calculating gas-turbine characteristics that have been corrected based on this correction value and comparing gas-turbine characteristics after correction with a predetermined reference value, whereby a highly accurate evaluation can be made.

The processor may calculate a model value of the gas-turbine characteristics based on the operation data, and estimate the correction value based on the model value.

According to the present invention, a highly accurate correction value can be obtained by calculating a model value of gas-turbine characteristics based on operation data and estimating a correction value based on the model value.

The gas-turbine characteristics may include at least one of an output of the gas turbine, an air intake flow amount of the compressor, an efficiency of the compressor, and a pressure of the compressed air.

According to the present invention, a highly accurate evaluation can be made on output of a gas turbine, an air intake flow amount of a compressor, efficiency of a compressor, and pressure of compressed air.

The operation data may include an atmospheric temperature and an atmospheric pressure in the environment where the gas turbine is placed, and an operation time of the gas turbine.

According to the present invention, a highly accurate correction value can be obtained by calculating a correction value based on an atmospheric temperature and atmospheric pressure in the environment where the gas turbine is placed, and an operation time of a gas turbine.

A characteristic evaluation method for a gas turbine according to the present invention is a characteristic evaluation method for a gas turbine that includes a compressor configured to compress air, a combustor supplied with fuel to combust the compressed air compressed by the compressor, and a turbine configured to be rotated by combustion gas generated by the combustor. The method includes calculating, in gas-turbine characteristics including characteristics of at least one of the compressor, the combustor, and the turbine, a correction value for correcting influence due to environmental conditions in which the gas turbine is placed, based on operation data of the gas turbine; calculating the gas-turbine characteristics corrected based on the correction value; and evaluating the gas turbine by comparing the gas-turbine characteristics after correction with a predetermined reference value.

According to the present invention, a highly accurate correction value can be obtained by calculating a correction value for correcting influence due to environmental conditions based on operation data of a gas turbine. An evaluation on a gas turbine is made by calculating gas-turbine characteristics that have been corrected based on this correction value and comparing gas-turbine characteristics after correction with a predetermined reference value, whereby a highly accurate evaluation can be made.

Advantageous Effects of Invention

The present invention can provide a characteristic evaluation device for a gas turbine and a characteristic evaluation method for a gas turbine, which are capable of making a highly accurate evaluation.

DETAILED DESCRIPTION OF THE INVENTION

An embodiment of a characteristic evaluation device for a gas turbine and a characteristic evaluation method for a gas turbine according to the present invention will now be described with reference to the accompanying drawings. It should be noted that the embodiment is not intended to limit this invention. Components in the embodiment include components that can be easily replaced by the skilled person or substantially like components.

Figure 1:
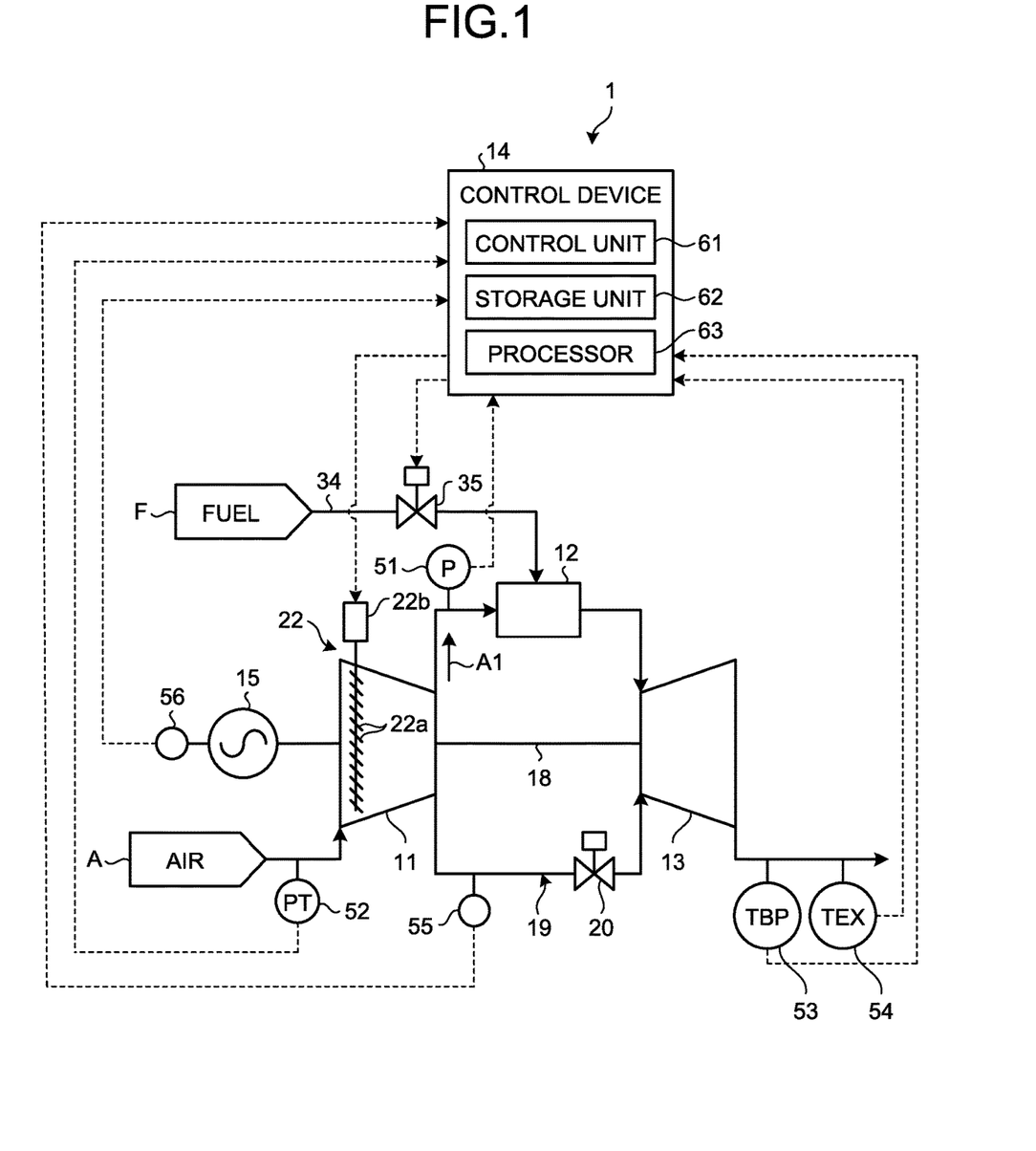
FIG. 1 is a schematic diagram illustrating a gas turbine in accordance with an embodiment.

FIG. 1 is a schematic diagram illustrating a gas turbine in accordance with the embodiment. As illustrated in FIG. 1, a gas turbine 1 in accordance with the embodiment includes a compressor 11, a combustor 12, and a turbine 13. On the central part of the compressor 11, the combustor 12, and the turbine 13, a rotor 18 is arranged passing through the center part. The compressor 11 and the turbine 13 are connected to each other to be integrally rotatable by the rotor 18. This gas turbine 1 is controlled by a control device 14. A generator 15 is connected to the gas turbine 1 so that power can be generated. The gas turbine 1 also includes a cooling air supply line 19 that supplies cooling air from the compressor 11 to the turbine 13. The cooling air supply line 19 is provided with a cooling air control valve 20.

The compressor 11 compresses air A that has been taken from an air inlet, and turns the air A into compressed air A1. In this compressor 11, there is arranged an inlet guide vane (IGV: air intake valve) 22 adjusting an air intake amount of the air A that has been taken from the air inlet. In the IGV 22, an air intake amount of the air A is adjusted by adjusting an opening thereof. Specifically, the IGV 22 includes a plurality of vane main bodies 22a and an IGV operating unit 22b for changing the vane angle of the vane main bodies 22a. The vane angle of the vane main bodies 22a is adjusted by the IGV operating unit 22b, whereby the opening of the IGV 22 is adjusted and an air intake amount of the air A is adjusted. As the opening of the IGV 22 is increased, an air intake amount of the air A is increased and a pressure ratio of the compressor 11 is increased. By contrast, as the opening of the IGV 22 is decreased, an air intake amount of the air A is decreased and a pressure ratio of the compressor 11 is decreased.

The combustor 12 supplies fuel F to the compressed air A1 that has been compressed by the compressor 11, and mixes and combusts the compressed air A1 and the fuel F to generate combustion gas. The turbine 13 is rotated by the combustion gas that has been generated by the combustor 12. The turbine 13 includes the rotor 18, a plurality of stages of turbine vanes, and a plurality of stages of turbine blades. The stages of turbine vanes and the stages of turbine blades are alternately provided in an axial direction of the rotor 18.

The rotor 18 has both end parts in the axial direction rotatably supported by a bearing part, which is not illustrated, and is rotatably provided centering on an axis center. A drive axis of the generator 15 is connected to an end part of the rotor 18 on the compressor 11 side. The generator 15 is provided coaxially with the turbine 13, and can generate power by rotation of the turbine 13.

Thus, the air A that has been taken from the air inlet of the compressor 11 becomes the compressed air A1 of a high temperature and high pressure by passing through the inside of the compressor 11 via the IGV 22 and being compressed. The fuel F is supplied from the combustor 12 to this compressed air A1, and the compressed air A1 and the fuel F are mixed and are combusted to generate combustion gas of a high temperature and high pressure. The combustion gas of a high temperature and high pressure that has been generated by the combustor 12 passes through the inside of the turbine 13, and this combustion gas causes the turbine 13 to be operated (rotated) to drive the rotor 18 to be rotated. The rotation of the rotor 18 drives the generator 15 connected to the rotor 18. In this manner, the generator 15 connected to the rotor 18 is driven to be rotated to generate power. By contrast, the combustion gas driving the turbine 13 recovers heat as flue gas and is discharged to the atmosphere.

The gas turbine 1 is provided with a chamber pressure indicator 51, an air intake state detector 52, a blade path thermometer 53, a flue gas thermometer 54, and a flowmeter 55. The chamber pressure indicator 51 is provided to a line that circulates the compressed air A1 from the compressor 11 to the combustor 12. Specifically, the chamber pressure indicator 51 is provided to the inside of a chamber of the combustor 12, and measures pressure (chamber pressure) of the compressed air A1. The air intake state detector 52 detects an air intake temperature and air intake pressure of the air A taken into the compressor 11. The blade path thermometer 53 is provided to a line that circulates flue gas discharged from the turbine 13, and measures a temperature of flue gas that passes through a blade at a final stage provided to a downstream side of the turbine 13 in a flow direction of flue gas. The flue gas thermometer 54 is provided to a downstream side of the blade path thermometer 53, and measures a temperature of flue gas. The flowmeter 55 measures a flow amount of cooling air flowing through the cooling air supply line 19. In addition, the gas turbine 1 is provided with an output meter 56 for detecting output (load) of the gas turbine 1. The control device 14 receives signals measured by the chamber pressure indicator 51, the air intake state detector 52, the blade path thermometer 53, the flue gas thermometer 54, the flowmeter 55, and the output meter 56.

The control device 14 includes a control unit 61, a storage unit 62, and a processor (a characteristic evaluation device for a gas turbine) 63. The control unit 61 controls the IGV 22, a fuel adjusting valve 35, and the like, based on the measurement result of the chamber pressure indicator 51, the air intake state detector 52, the blade path thermometer 53, the flue gas thermometer 54, the flowmeter 55, and the like, and controls operation of the gas turbine 1. The control unit 61 controls operation of the gas turbine 1 depending on output of the gas turbine 1 (output of the generator 15).

In addition, the control unit 61 can calculate operation data such as gas-turbine characteristics, inlet pressure loss, outlet pressure loss, the number of rotations, relative humidity, and an operation time, based on the measurement result of the chamber pressure indicator 51, the air intake state detector 52, the blade path thermometer 53, the flue gas thermometer 54, the flowmeter 55, and the output meter 56. The gas-turbine characteristics include characteristics of at least one of the compressor 11, the combustor 12, and the turbine 13. Examples of the gas-turbine characteristics include output of the gas turbine 1, an air intake flow amount of the compressor 11, efficiency of the compressor 11, and chamber pressure.

The storage unit 62 stores therein various kinds of programs and data related to operation of the gas turbine 1.

Figure 2:
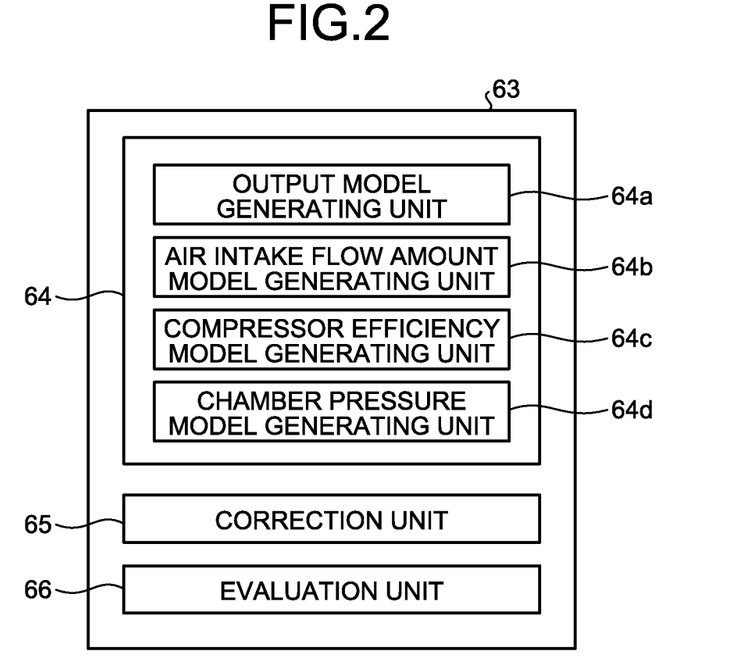
FIG. 2 is block diagram illustrating the configuration of a processor.

FIG. 2 is block diagram illustrating the configuration of the processor 63. As illustrated in FIG. 2, the processor 63 includes a characteristic model generating unit 64, a correction unit 65, and an evaluation unit 66. The characteristic model generating unit 64 calculates a model value of gas-turbine characteristics, based on operation data of the gas turbine 1.

The characteristic model generating unit 64 includes an output model generating unit 64a, an air intake flow amount model generating unit 64b, a compressor efficiency model generating unit 64c, and a chamber pressure model generating unit 64d. The output model generating unit 64a generates a model of output characteristics of the gas turbine 1.

Figure 4:
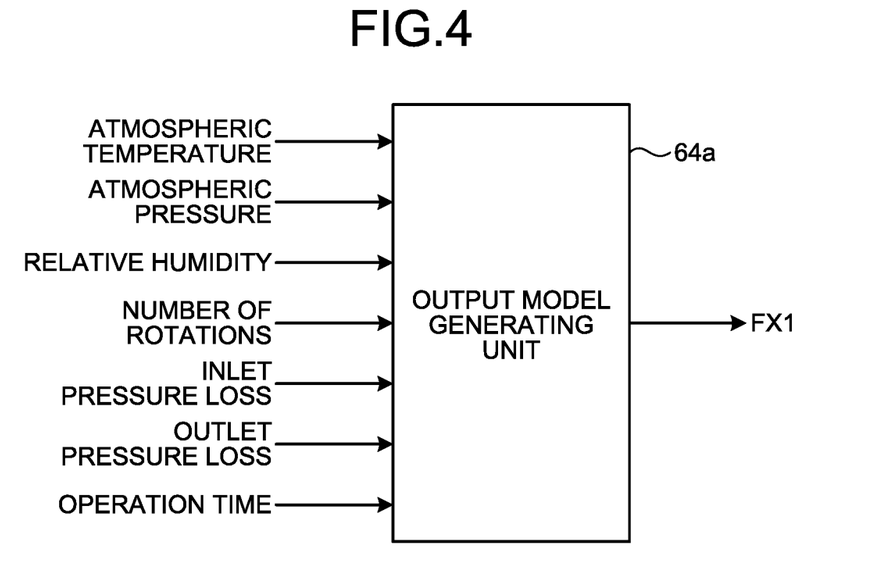
FIG. 4 is a block diagram illustrating an example of an output model generating unit.

FIG. 4 is a block diagram illustrating an example of the output model generating unit 64a. As illustrated in FIG. 4, the output model generating unit 64a receives an atmospheric temperature, atmospheric pressure, relative humidity, the number of rotations, inlet pressure loss, outlet pressure loss, and an operation time, as operation data. The output model generating unit 64a generates an output model FX1 that is a model of output characteristics of the gas turbine 1, based on the respective operation data, and calculates a correction value of the respective operation data based on the generated output model FX1. The output model generating unit 64a can use well-known techniques such as linear multi-regression analysis, non-linear multi-regression analysis, a neural network, and ensemble learning.

In the present embodiment, a case where linear multi-regression analysis is used will be described as an example. When measurement values and reference values (a measurement value, a reference value) of operation data are each defined as an atmospheric temperature (T, T0), atmospheric pressure (P, P0), relative humidity (H, H0), the number of rotations (R, R0), inlet pressure loss (Pi, Pi0), outlet pressure loss (Pe, Pe0), and an operation time (A, A0), the output model FX1 is represented by the following expression.

$$FX1 = -a(T-T0) - b(P-P0) - c(H-H0) - d(R-R0) - e(Pi-Pi0) - f(Pe-Pe0) - g(A-A0) + h$$

In the expression, a, b, c, d, e, f, g, and h are constants, and h indicates output (unit: MW) serving as a reference. The reference values of operation data T0, P0, H0, R0, Pi0, Pe0, and A0 are values in environmental conditions serving as a reference of evaluation on output characteristics. The reference values can be preliminarily defined. Based on the generated output model, the output model generating unit 64a can obtain a correction value of the respective operation data using linear multi-regression analysis.

Figure 8:
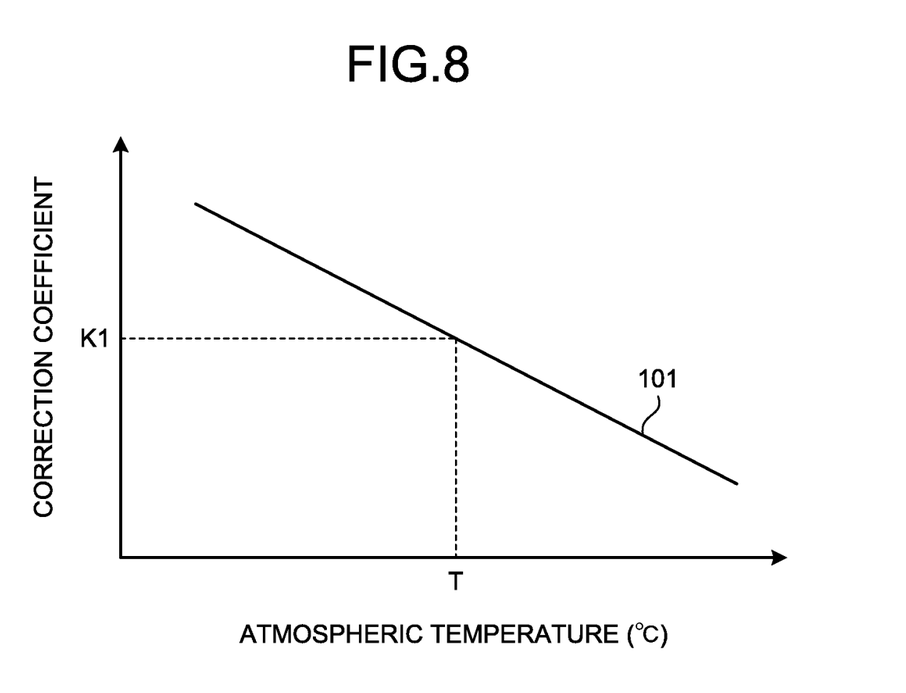
FIG. 8 is a graph illustrating an example of a correction value about an atmospheric temperature.

FIG. 8 is a graph illustrating an example of a correction value about an atmospheric temperature. The longitudinal axis in FIG. 8 represents a correction coefficient (correction value), and the lateral axis represents an atmospheric temperature. As illustrated in FIG. 8, a straight line 101 of an atmospheric temperature obtained by linear multi-regression analysis is linear so that a correction coefficient is smaller, for example, as the atmospheric temperature is higher. Characteristics such as an inclination of the straight line 101 are an example, and these are not limiting.

Figure 5:
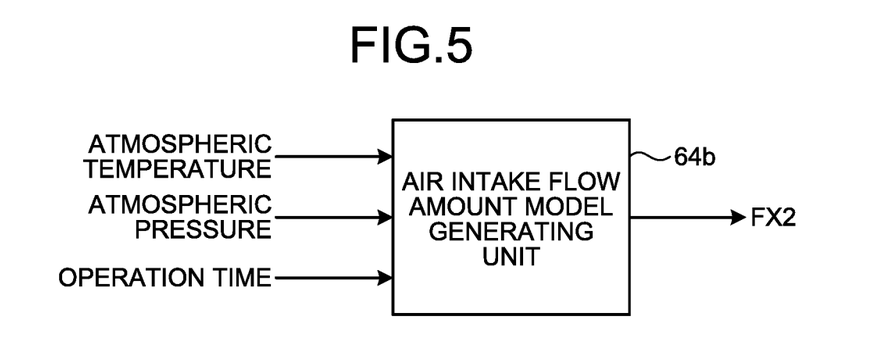
FIG. 5 is a block diagram illustrating an example of an air intake flow amount model generating unit.

FIG. 5 is a block diagram illustrating an example of the air intake flow amount model generating unit 64b. As illustrated in FIG. 5, the air intake flow amount model generating unit 64b receives an atmospheric temperature, atmospheric pressure, and an operation time, as operation data. Similarly to the output model generating unit 64a, the air intake flow amount model generating unit 64b generates an air intake flow amount model FX2 that is a model of an air intake flow amount of the compressor 11, based on the respective operation data.

The air intake flow amount model generating unit 64b generates an air intake flow amount model using well-known techniques such as linear multi-regression analysis, non-linear multi-regression analysis, a neural network, and ensemble learning, and can obtain, based on the generated air intake flow amount model, a correction value of the respective operation data using linear multi-regression analysis.

Figure 6:
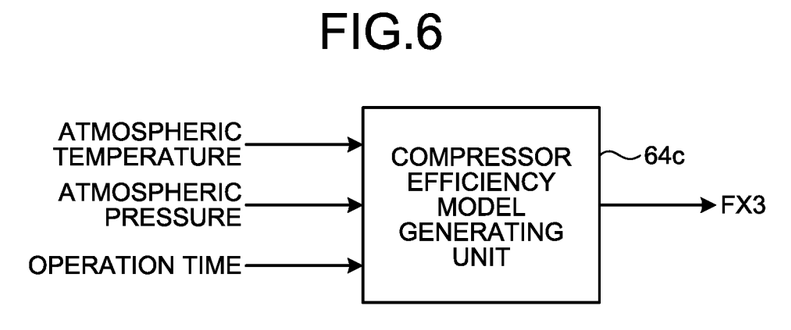
FIG. 6 is a block diagram illustrating an example of a compressor efficiency model generating unit.

FIG. 6 is a block diagram illustrating an example of the compressor efficiency model generating unit 64c. As illustrated in FIG. 6, the compressor efficiency model generating unit 64c receives an atmospheric temperature, atmospheric pressure, and an operation time, as operation data. Similarly to the output model generating unit 64a, the compressor efficiency model generating unit 64c generates a compressor efficiency model FX3 that is a model of efficiency of the compressor 11, based on the respective operation data.

The compressor efficiency model generating unit 64c generates a compressor efficiency model using well-known techniques such as linear multi-regression analysis, non-linear multi-regression analysis, a neural network, and ensemble learning, and can obtain, based on the generated compressor efficiency model, a correction value of the respective operation data using linear multi-regression analysis.

Figure 7:
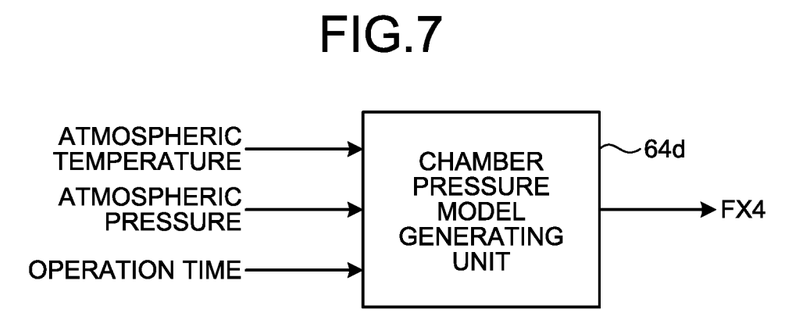
FIG. 7 is a block diagram illustrating an example of a chamber pressure model generating unit.

FIG. 7 is a block diagram illustrating an example of the chamber pressure model generating unit 64d. As illustrated in FIG. 7, the chamber pressure model generating unit 64d receives an atmospheric temperature, atmospheric pressure, and an operation time, as operation data. Similarly to the output model generating unit 64a, the chamber pressure model generating unit 64d generates a chamber pressure model FX4 that is a model of pressure characteristics (chamber pressure characteristics) of the compressed air A1, based on the respective operation data.

The chamber pressure model generating unit 64d generates a chamber pressure model using well-known techniques such as linear multi-regression analysis, non-linear multi-regression analysis, a neural network, and ensemble learning, and can obtain, based on the generated chamber pressure model, a correction value of the respective operation data using linear multi-regression analysis.

The correction unit 65 illustrated in FIG. 2 obtains, about each of the gas-turbine characteristics, the gas-turbine characteristics after correction where the degree of influence caused by environmental conditions is eliminated or reduced from the gas-turbine characteristics. As the gas-turbine characteristics, output of the gas turbine 1 will be described as an example. Out of the calculated correction values, when the correction values about an atmospheric temperature, about atmospheric pressure, about relative humidity, about the number of rotations, about inlet pressure loss, about outlet pressure loss, and about an operation time are defined as K1, K2, K3, K4, K5, K6, and K7, respectively, and a detection result of the output meter 56 is defined as G, output G' in environmental conditions serving as a reference can be obtained, for example, as follows.

$$G'=G/(K1 \cdot K2 \cdot K3 \cdot K4 \cdot K5 \cdot K6 \cdot K7)$$

Out of the gas-turbine characteristics that have been measured by various kinds of measuring devices and the like or calculated by the control unit 61, when the values of an air intake flow amount, of compressor efficiency, and of chamber pressure are defined as X, Y, and Z, respectively, an air intake flow amount X', compressor efficiency Z', and chamber pressure Y' in environmental conditions serving as a reference can be obtained similarly as follows.

$$X'=X/(K1 \cdot K2 \cdot K7)$$

$$Y'=Y/(K1 \cdot K2 \cdot K7)$$

$$Z'=Z/(K1 \cdot K2 \cdot K7)$$

The evaluation unit 66 evaluates the obtained gas-turbine characteristics after correction. The output G' that has been corrected by the correction unit 65 is a value where influence due to environmental conditions has been eliminated or reduced. Thus, the evaluation unit 66 can evaluate, for example, based on the output G' that has been obtained by the correction unit 65, a change and the like in output of the gas turbine 1 due to contamination, deterioration, and the like. In this case, an evaluation can be made by preliminarily obtaining a reference value of output of the gas turbine 1 in the reference environmental conditions and comparing with the reference value.

As this reference value, output of the gas turbine 1 in, for example, a state where there are no contamination, deterioration, and the like in the reference environmental conditions or a state where contamination, deterioration, and the like are less than a predetermined threshold can be defined. In addition, the evaluation unit 66 may evaluate a factor of a change in output, based on the difference between the reference value and a measurement value of output of the gas turbine 1.

For an air intake flow amount, compressor efficiency, and chamber pressure, the evaluation unit 66 can similarly evaluate, based on each of the gas-turbine characteristics that have been corrected by the correction unit 65, a change in gas-turbine characteristics due to contamination, deterioration, and the like, a factor of a change in gas-turbine characteristics, and the like.

In the present embodiment, each of the characteristic models is generated using linear multi-regression analysis. When the output model generating unit 64a, the air intake flow amount model generating unit 64b, the compressor efficiency model generating unit 64c, and the chamber pressure model generating unit 64d each receive operation data such as an atmospheric temperature, characteristics (output, an air intake flow amount, compressor efficiency, and chamber pressure) as a theoretical value are calculated. These characteristics are values corresponding to gas-turbine characteristics that have been corrected based on the correction values. Thus, the evaluation unit 66 may make an evaluation by comparing the measurement value of output, an air intake flow amount, compressor efficiency, and chamber pressure with a theoretical value calculated by linear multi-regression analysis.

Each unit in the characteristic model generating unit 64 receives a value of an operation time, as operation data, to calculate a degree of a change in gas-turbine characteristics due to lapse of an operation time, in other words, a degree of a change in gas-turbine characteristics due to deterioration. Thus, the evaluation unit 66 may make an evaluation on deterioration, by comparing corrected gas-turbine characteristics with a degree of a change in gas-turbine characteristics due to calculated deterioration.

Figure 3:
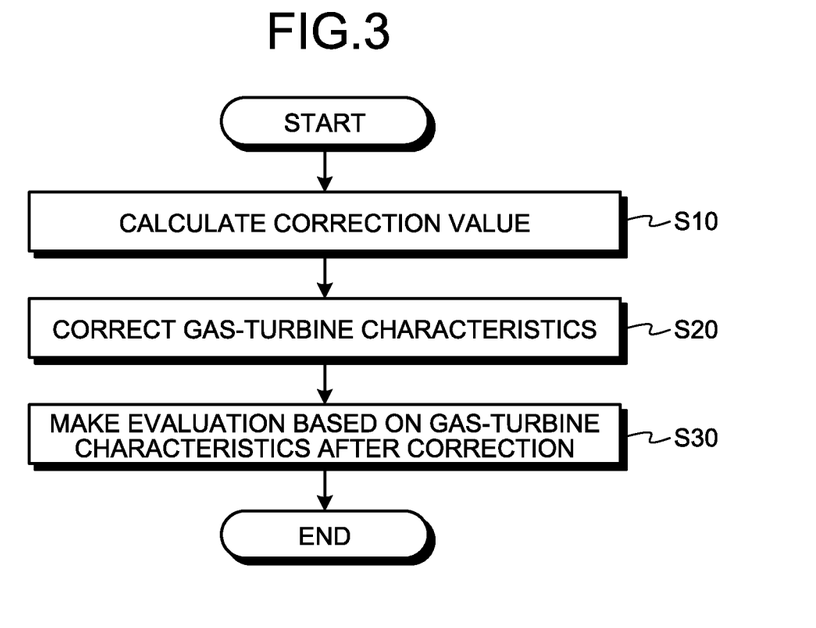
FIG. 3 is a flowchart illustrating an example of a method for evaluating characteristics of the gas turbine.

The following describes a method for evaluating gas-turbine characteristics that are formed as above. FIG. 3 is a flowchart illustrating an example of a method for evaluating characteristics of the gas turbine. As illustrated in FIG. 3, the processor 63 calculates a correction value for correcting influence on gas-turbine characteristics due to environmental conditions (step S10). At step S10, the characteristic model generating unit 64 generates a characteristic model about each characteristic of the gas turbine 1, and calculates a correction value of operation data based on the generated characteristic model.

Subsequently, the processor 63 corrects gas-turbine characteristics, based on the calculated correction value (step S20). At step S20, the correction unit 65 obtains gas-turbine characteristics after correction in the environmental conditions serving as a reference, based on the correction value that has been calculated for each gas-turbine characteristic. The gas-turbine characteristics after correction are the value where influence due to environmental conditions is eliminated or reduced.

Subsequently, the processor 63 makes an evaluation based on the gas-turbine characteristics after correction (step S30). At step S30, the evaluation unit 66 makes an evaluation on gas-turbine characteristics, by comparing the gas-turbine characteristics after correction with an actual measurement value of gas-turbine characteristics. A highly accurate evaluation can be obtained because the evaluation is based on the gas-turbine characteristics where influence due to environmental conditions is eliminated or reduced.

As described above, the characteristic evaluation device for a gas turbine according to the present embodiment calculates a correction value for correcting influence due to environmental conditions based on operation data of the gas turbine 1, and therefore can obtain a highly accurate correction value. By making an evaluation on the gas-turbine characteristics by correcting gas-turbine characteristics based on this correction value and comparing the gas-turbine characteristics after correction with a predetermined reference value, the device for evaluating characteristics of a gas turbine according to the present embodiment can make a highly accurate evaluation.

The characteristic evaluation device for a gas turbine according to the present embodiment can calculate a degree of a change in gas-turbine characteristics due to deterioration. Thus, the device for evaluating characteristics of a gas turbine according to the present embodiment can evaluate deterioration characteristics depending on environmental conditions in which each gas turbine 1 is placed and respective operation data for each gas turbine 1 to make a highly accurate evaluation.

A technical scope of the present invention is not limited to the embodiment, and various changes may be made as appropriate without departing from the significance of the present invention. For example, in the embodiment, a case where the characteristic model generating unit 64 generates a characteristic model using linear multi-regression analysis has been described as an example, but this is not limiting. A characteristic model may be generated using a non-linear method.

Figure 9:
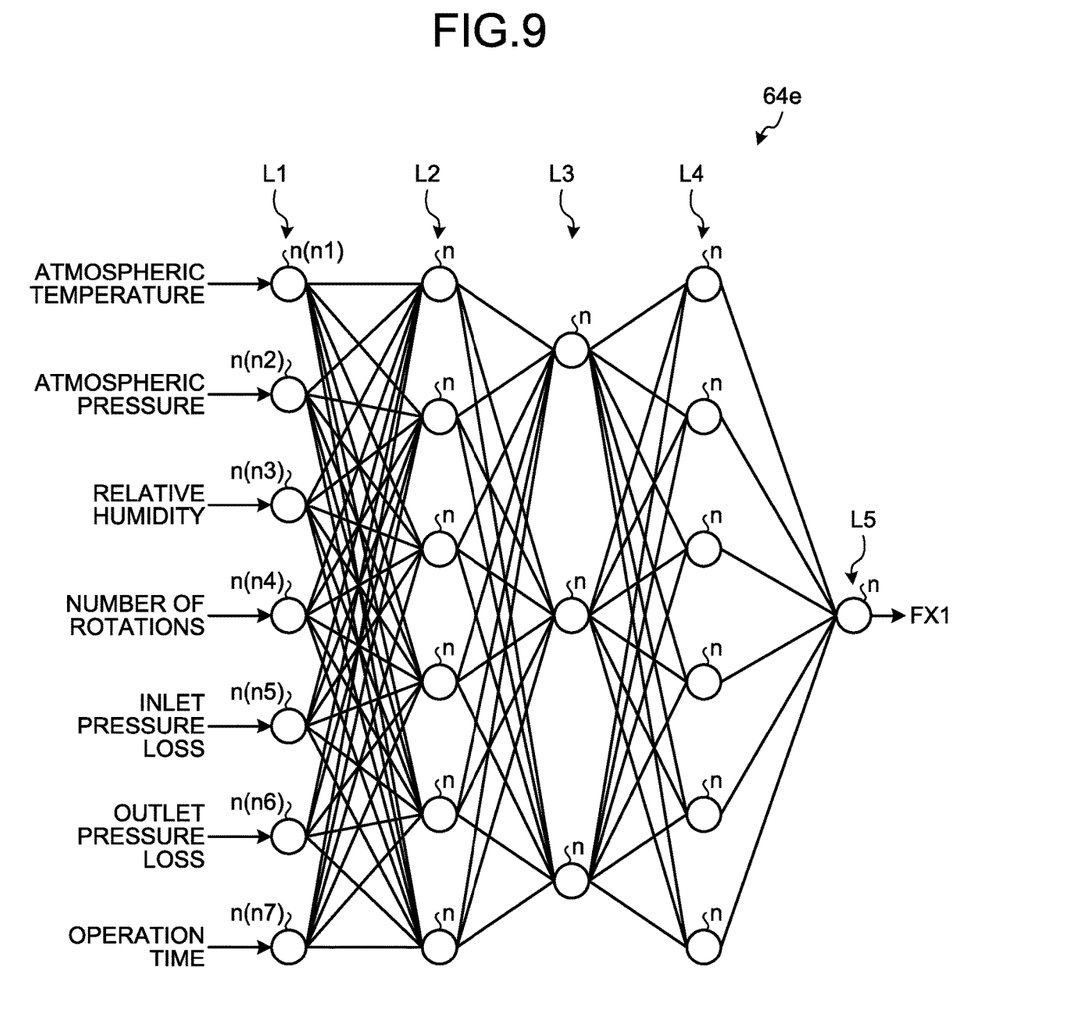
FIG. 9 is a view schematically illustrating a state where a characteristic model is generated using a hierarchical neural network.

The characteristic model generating unit 64 can generate a characteristic model, for example, using a neural network as the non-linear method. FIG. 9 is a view schematically illustrating a state where a characteristic model is generated using a hierarchical neural network. FIG. 9 illustrates an output model generating unit 64e that outputs the output model FX1 as an example of the characteristic model generating unit. The output model generating unit 64e includes a first layer L1 serving as a reception layer, second, third, and fourth layers L2, L3 and L4, serving as intermediate layers, and a fifth layer L5 serving as an output layer. In the output model generating unit 64e, the intermediate layer is made of three layers, but this is not limiting. The intermediate layer may be made of two layers or less, or four layers or more. The first layer L1, the second layer L2, the third layer L3, the fourth layer L4, and the fifth layer L5 each include one or a plurality of nodes n.

The first layer L1 includes seven nodes n (n1, n2, n3, n4, n5, n6, and n7). The node n1 receives an atmospheric temperature. The node n2 receives atmospheric pressure. The node n3 receives relative humidity. The node n4 receives the number of rotations. The node n5 receives inlet pressure loss. The node n6 receives outlet pressure loss. The node n7 receives an operation time. The seven nodes n of the first layer L1 each output a signal to each node n in the second layer L2.

The second layer L2 includes, for example, six nodes n. The six nodes n in the second layer L2 each receive a signal that has been output from the seven nodes n in the first layer L1. The six nodes n in the second layer L2 each output a signal to each node n in the third layer L3. In the second layer L2, the number of nodes n is not limited to six, and may be equal to or less than five or equal to or more than seven.

The second layer L3 includes three nodes n. The three nodes n in the third layer L3 each receive a signal that has been output from the six nodes n in the second layer L2. The six nodes n in the third layer L3 each output a signal to each node n in the fourth layer L4. In the third layer L3, the number of nodes n is not limited to three, and may be equal to or less than two or equal to or more than four.

The fourth layer L4 includes six nodes n. The six nodes n in the fourth layer L4 each receive a signal that has been output from the three nodes n in the third layer L3. The six nodes n in the fourth layer L4 each output a signal to a node n in the fifth layer L5. In the fourth layer L4, the number of nodes n is not limited to six, and may be equal to or less than five or equal to or more than seven.

The fifth layer L5 includes one node n. The three nodes n in the fifth layer L5 receive a signal that has been output from the six nodes n in the fourth layer L4. The node n in the fifth layer L5 outputs, for example, the output model FX1. In the fifth layer L5, the number of nodes n is not limited to one, and may be equal to or more than two.

The configuration where the output model generating unit 64e outputs the output model FX1 using a neural network has been described as an example, but this is not limiting. For example, the air intake flow amount model generating unit that outputs the air intake flow amount model FX2, the compressor efficiency model generating unit that outputs the compressor efficiency model FX3, and the chamber pressure model generating unit that outputs the chamber pressure model FX4 may output each characteristic model using a neural network described above. In this case, the number of nodes of the reception layer, the number of layers in the respective intermediate layers, and the number of nodes in each layer can be changed as appropriate depending on the kinds of input signals.

In FIG. 9, the case where a hierarchical neural network is used has been described as an example, but this is not limiting. A neural network different from the hierarchical neural network, for example, an interconnecting neural network may be used.

Figure 10:
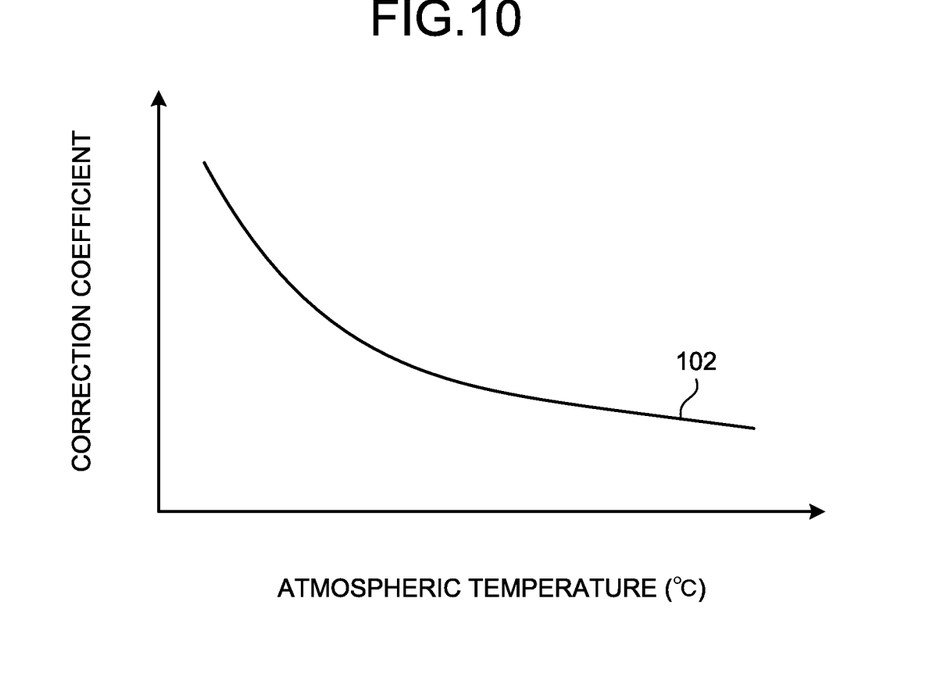
FIG. 10 is a graph illustrating an example of a correction value about an atmospheric temperature.

FIG. 10 is a graph illustrating an example of a correction value about an atmospheric temperature. The longitudinal axis in FIG. 10 represents a correction coefficient (correction value), and the lateral axis represents an atmospheric temperature. As illustrated in FIG. 10, a curve line 102 of an atmospheric temperature is curved. For example, as the atmospheric temperature is higher, a decrease amount of a correction coefficient is smaller. In this manner, not only the linear but also curved curve line 102 can be obtained, by using a non-linear method such as the neural network illustrated in FIG. 9. Thus, a more highly accurate correction value can be obtained. For example, even when it is difficult to preliminarily understand characteristics such as a change in output of the gas turbine 1 with respect to an operation time, a more highly accurate correction value can be obtained.

Figure 11:
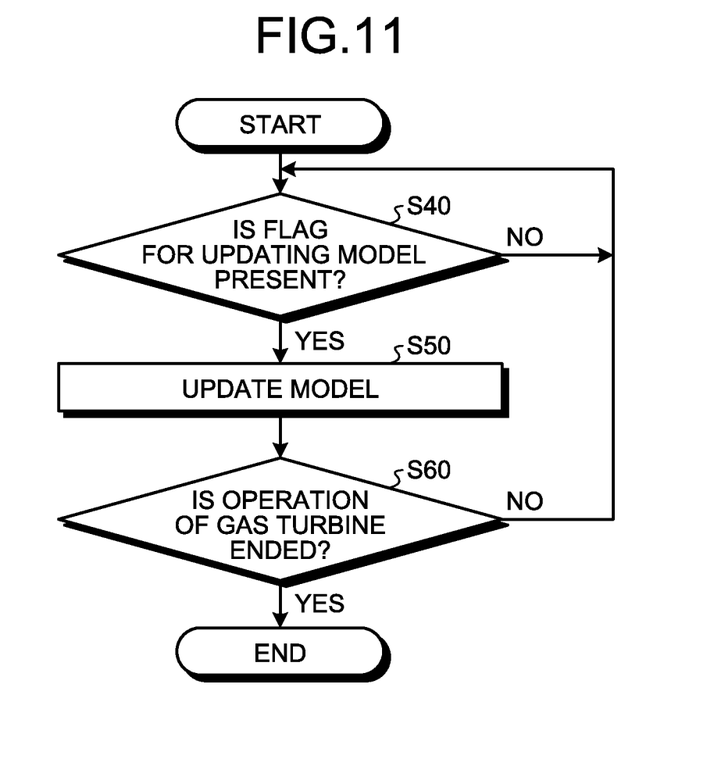
FIG. 11 is a flowchart illustrating procedures for updating a characteristic model.

In the configuration of the embodiment, the characteristic model generating unit 64 may sequentially update a characteristic model of gas-turbine characteristics. FIG. 11 is a flowchart illustrating procedures for updating a characteristic model. As illustrated in FIG. 11, the characteristic model generating unit 64 detects the presence or absence of a flag for updating a characteristic model (step S40). At step S40, a flag for updating a characteristic model can be generated, for example, when a predetermined period elapses (for example, when one day elapses, when one week elapses, and when one month elapses) and when a predetermined periodic inspection is performed. When not detecting a flag (No at step S40), the characteristic model generating unit 64 repeats the processing at step S40.

When detecting a flag (Yes at step S40), the characteristic model generating unit 64 updates a characteristic model of gas-turbine characteristics (step S50). At step S50, the characteristic model generating unit 64 newly generates a characteristic model based on the received operation data. Because the generated characteristic model is newly generated in a state where operation data has been accumulated after the previous characteristic model was generated, the generated characteristic model becomes a more highly accurate characteristic model. The characteristic model generating unit 64 calculates a correction value for each operation data, based on the generated characteristic model. The correction unit 65 corrects gas-turbine characteristics, based on the newly calculated correction value. The evaluation unit 66 makes an evaluation based on the gas-turbine characteristics that have been corrected based on the new correction value. Thus, a highly accurate evaluation is obtained.

After update of a characteristic model, when operation of the gas turbine 1 is not ended (No at step S60), the characteristic model generating unit 64 repeats operation from step S40. When operation of the gas turbine 1 is ended (Yes at step S60), the characteristic model generating unit 64 ends the processing.

In this manner, the characteristic model generating unit 64 can calculate a correction value, based on the accumulated operation data by updating a characteristic model. When gas-turbine characteristics that have been corrected based on the correction value are evaluated, a highly accurate evaluation can be obtained.

Figure 12:
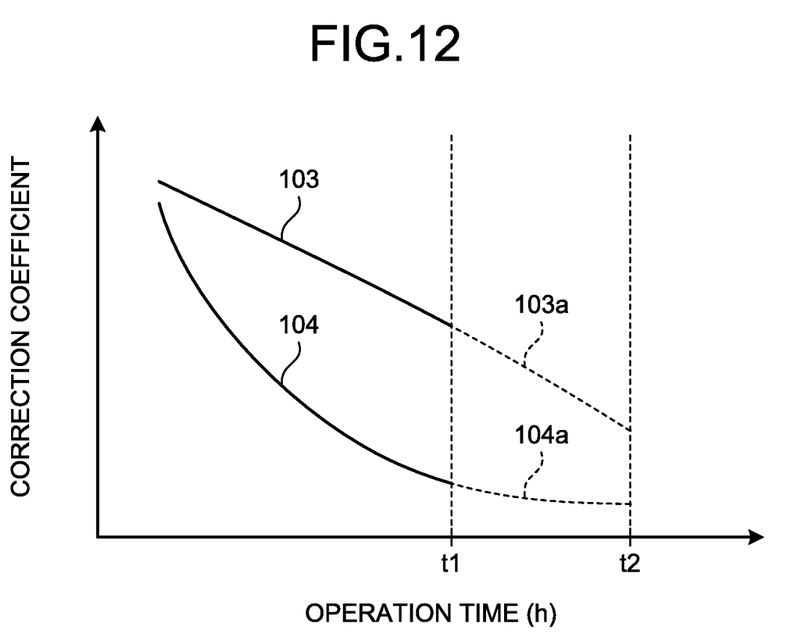
FIG. 12 is a graph illustrating an example of a correction value about an operation time.

In the configuration of the embodiment described above, the characteristic model generating unit 64 may predict (i.e., estimate) and calculate a future correction value based on the obtained correction value. FIG. 12 is a graph illustrating an example of a correction value about an operation time. The longitudinal axis in FIG. 12 represents a correction coefficient (correction value), and the lateral axis represents an operation time. As illustrated in FIG. 12, for example, at a time t1 when the characteristic model generating unit 64 generates a characteristic model, a correction value up to the time t1 is calculated as a correction value of an operation time. A straight line 103 is a correction value obtained by, for example, linear multi-regression analysis. A curve line 104 is a correction value obtained by, for example, a non-linear method. In each case, a correction value up to the time t1 is calculated.

In this state, the characteristic model generating unit 64 may predict a future correction value, for example, a correction value up to a time t2 later than the time t1, based on the inclination of the straight line 103 and the curve line 104. The straight line 103*a* and the curve line 104*a* indicate correction values that have been predicted based on the straight line 103 and the curve line 104, respectively. In this case, the correction unit 65 may calculate, by correcting gas-turbine characteristics based on the predicted correction value, the gas-turbine characteristics after future correction. The evaluation unit 66 may make an evaluation based on the gas-turbine characteristics that have been calculated after future correction. In this manner, an evaluation related to future gas-turbine characteristics can be obtained.

In the embodiment, the configuration where, for example, the output model generating unit 64*a* receives an atmospheric temperature, atmospheric pressure, relative humidity, the number of rotations, inlet pressure loss, outlet pressure loss, and an operation time, as operation data, has been described as an example, but this is not limiting. The output model generating unit 64*a* may receive other operation data.

Figure 13:
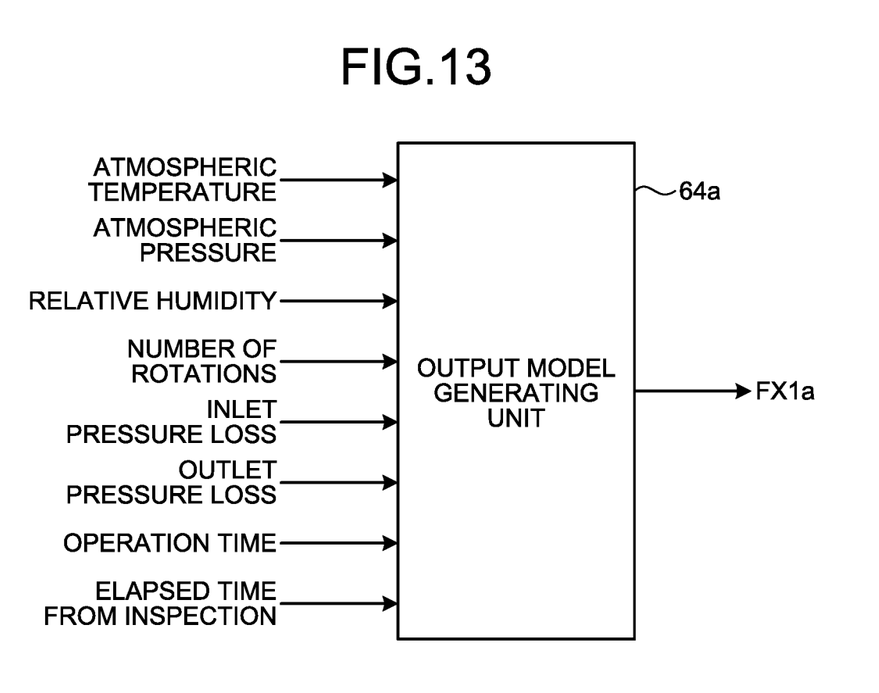
FIG. 13 is a block diagram illustrating an example of an output model generating unit.

FIG. 13 is a block diagram illustrating an example of the output model generating unit 64*a*. As illustrated in FIG. 13, the output model generating unit 64*a* may receive data of an elapsed time from a periodic inspection, in addition to the above-mentioned operation data. The output model generating unit 64*a* generates an output model FX1*a* that is a model of output characteristics of the gas turbine 1, based on the respective operation data, and calculates a correction value of the respective operation data based on the generated output model FX1*a*.

Figure 14:
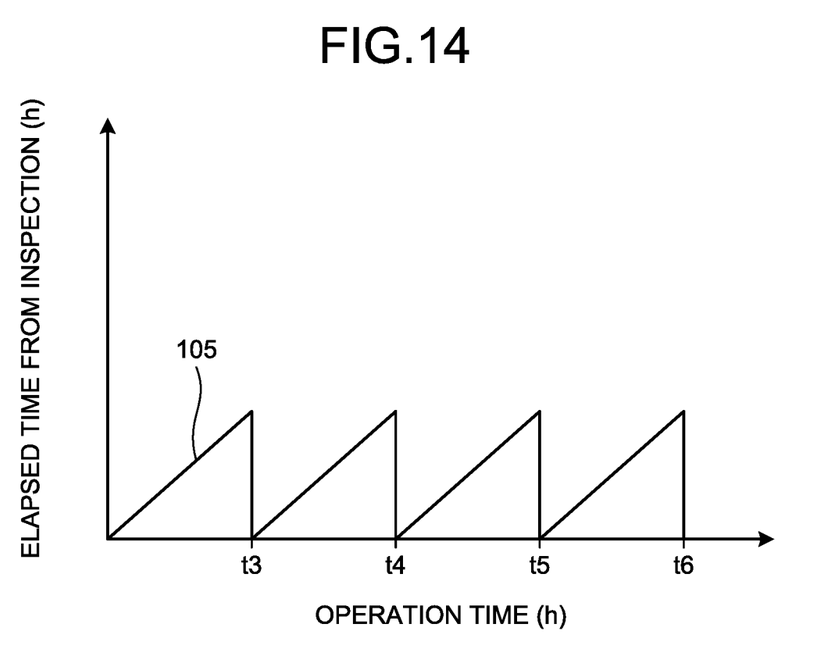
FIG. 14 is a graph illustrating relation between an operation time of the gas turbine and an elapsed time from a periodic inspection.

FIG. 14 is a graph illustrating relation between an operation time of the gas turbine 1 and an elapsed time from a periodic inspection. As illustrated in FIG. 14, the periodic inspection of the gas turbine 1 are periodically performed, for example, at a time t3, a time t4, a time t5, and a time t6 from the start of operation. A broken line 105 indicates a state where an elapsed time is reset for each periodic inspection. The periodic inspection include, for example, a combustor inspection that is an inspection of the combustor 12, a turbine inspection that is an inspection of the turbine 13, and a major inspection. By performing the turbine inspection, the combustor inspection is also performed. By performing the major inspection, the turbine inspection and the combustor inspection are also performed.

Figure 15:
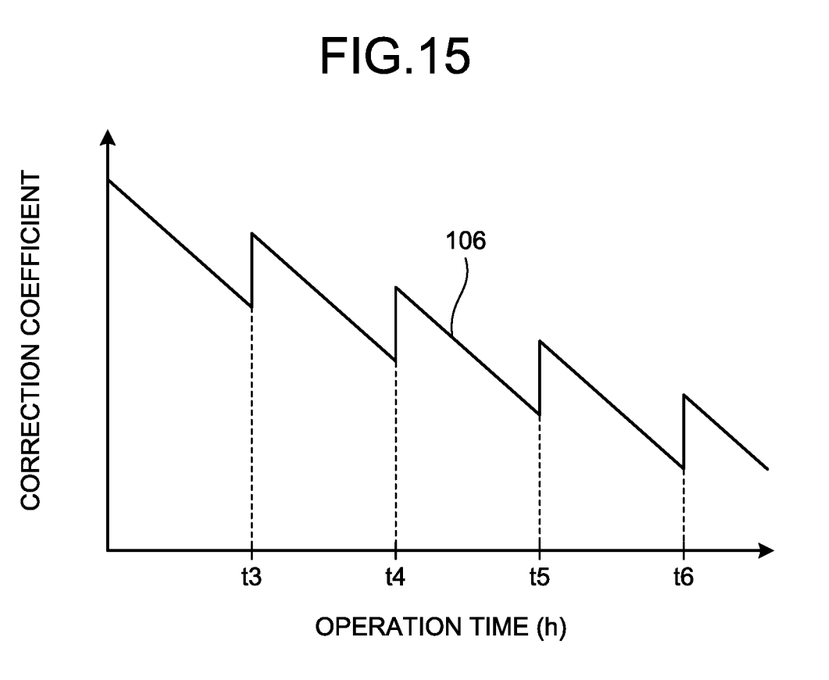
FIG. 15 is a graph illustrating relation between an operation time and a correction coefficient when a periodic inspection are performed.

FIG. 15 is a graph illustrating relation between an operation time and a correction coefficient when periodical inspection are performed. In the gas turbine 1, whenever a periodic inspection is performed, a decrease in output is improved, for example. In other words, whenever a periodic inspection is performed, output is increased. Thus, when an evaluation on contamination, deterioration, and the like is made, influence of an output increase by a periodic inspection needs to be eliminated or reduced. As illustrated in FIG. 15, the output model generating unit 64*a* calculates a correction value at each of the times t3, t4, t5, and t6 at when a periodic inspection are performed from the start of operation so that influence of an output increase is eliminated or reduced. Thus, a shape of a broken line 106 indicating a correction value represents a state where the correction value is rapidly increased at times t3, t4, t5, and t6, for example. A more highly accurate correction value and thus evaluation can be obtained by reflecting the influence of periodic inspection on gas-turbine characteristics such as output.

REFERENCE SIGNS LIST

1 Gas turbine
11 Compressor
12 Combustor
13 Turbine
14 Control device
15 Generator
18 Rotor
19 Cooling air supply line
20 Cooling air control valve
22 Inlet guide vane
22*a* Vane main body
22*b* IGV operating unit
35 Fuel adjusting valve
51 Chamber pressure indicator
52 Air intake state detector
53 Blade path thermometer
54 Flue gas thermometer
55 Flowmeter
56 Output meter
61 Control unit
62 Storage unit
63 Processor 64 Characteristic model generating unit
64a, 64e Output model generating unit
64b Air intake flow amount model generating unit
64c Compressor efficiency model generating unit
64d Chamber pressure model generating unit
65 Correction unit
66 Evaluation unit
101, 103, 103a Straight line
102, 104, 104a Curve line
105, 106 Broken line
A Air
A1 Compressed air
F Fuel
H0, P0, R0, T0, Pe0, Pi0 Reference value
FX1, FX1a Output model
FX2 Air intake flow amount model
FX3 Compressor efficiency model
FX4 Chamber pressure model
L1 First layer
L2 Second layer
L3 Third layer
L4 Fourth layer
L5 Fifth layer
n, n1, n2, n3, n4, n5, n6, n7 Node
t1, t2, t3, t4, t5, t6 Time

The invention claimed is:

1. A characteristic evaluation device for evaluating a gas turbine, the gas turbine including a compressor configured to compress air, a combustor supplied with fuel to combust the compressed air compressed by the compressor, and a turbine configured to be rotated by combustion gas generated by the combustor, the evaluation device comprising:
 a processor configured to calculate, in gas-turbine characteristics including characteristics of at least one of the compressor, the combustor, and the turbine, a correction value for correcting influence due to environmental conditions in which the gas turbine is placed, based on operation data of the gas turbine, to calculate the gas-turbine characteristics corrected based on the correction value, and to evaluate the gas turbine by comparing the gas-turbine characteristics after correction with a predetermined reference value;
 wherein the operation data includes an elapsed time from a periodic inspection of the gas turbine, and
 wherein the processor is further configured to calculate a model value of the gas-turbine characteristics based on the operation data, to estimate the correction value based on the model value, and to update the model value when the periodic inspection is performed.

2. The characteristic evaluation device for evaluating a gas turbine according to claim 1, wherein the gas-turbine characteristics include at least one of an output of the gas turbine, an air intake flow amount of the compressor, an efficiency of the compressor, and a pressure of the compressed air.

3. The characteristic evaluation device for evaluating a gas turbine according to claim 1, wherein the operation data includes an atmospheric temperature and an atmospheric pressure in the environment where the gas turbine is placed, and an operation time of the gas turbine.

4. A characteristic evaluation method of evaluating a gas turbine, the gas turbine including a compressor configured to compress air, a combustor supplied with fuel to combust the compressed air compressed by the compressor, and a turbine configured to be rotated by combustion gas generated by the combustor, the evaluation method comprising:
 calculating, in gas-turbine characteristics including characteristics of at least one of the compressor, the combustor, and the turbine, a correction value for correcting influence due to environmental conditions in which the gas turbine is placed, based on operation data of the gas turbine;
 calculating the gas-turbine characteristics corrected based on the correction value; and
 evaluating the gas turbine by comparing the gas-turbine characteristics after correction with a predetermined reference value,
 wherein the operation data includes an elapsed time from a periodic inspection of the gas turbine; and
 calculating a model value of the gas-turbine characteristic based on the operation data, estimating the correction value based on the model value, and updating the model value when the periodic inspection is performed.

* * * * *